United States Patent
Halberstadt et al.

(10) Patent No.: US 8,756,834 B1
(45) Date of Patent: *Jun. 24, 2014

(54) CUSHIONED ATHLETIC CLEAT

(75) Inventors: John Philip Halberstadt, Broomfield, CO (US); Stanley Hockerson, Albuquerque, NM (US)

(73) Assignee: Heart and Sole USA, LLC, Broomfield, CO (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/492,184

(22) Filed: Jun. 8, 2012

Related U.S. Application Data

(63) Continuation-in-part of application No. 12/464,682, filed on May 12, 2009, which is a continuation-in-part of application No. 12/072,422, filed on Feb. 26, 2008, now Pat. No. 8,291,617.

(60) Provisional application No. 60/904,028, filed on Feb. 28, 2007.

(51) Int. Cl.
*A43B 5/02* (2006.01)
*A43C 15/16* (2006.01)

(52) U.S. Cl.
USPC .................. 36/59 R; 36/98; 36/128; 36/77 R

(58) Field of Classification Search
USPC ................. 36/59 R, 98, 128, 67 A, 67 R, 126
See application file for complete search history.

(56) References Cited

U.S. PATENT DOCUMENTS

| | | | | |
|---|---|---|---|---|
| 3,352,033 | A * | 11/1967 | Colley | 36/11.5 |
| 3,566,427 | A * | 3/1971 | Davis | 441/76 |
| 4,151,661 | A * | 5/1979 | Namba et al. | 36/30 R |
| 4,455,765 | A * | 6/1984 | Sjosward | 36/30 R |
| 5,979,083 | A * | 11/1999 | Robinson et al. | 36/127 |
| 7,146,752 | B2 * | 12/2006 | Pasternak et al. | 36/59 R |
| 8,291,617 | B2 * | 10/2012 | Halberstadt et al. | 36/59 R |
| 2005/0262737 | A1 * | 12/2005 | Vattes | 36/59 R |
| 2005/0274044 | A1 * | 12/2005 | Baek | 36/59 R |
| 2006/0141234 | A1 * | 6/2006 | Rearick et al. | 428/304.4 |
| 2007/0017124 | A1 * | 1/2007 | Koo et al. | 36/59 R |

* cited by examiner

*Primary Examiner* — Ted Kavanaugh
(74) *Attorney, Agent, or Firm* — Garvey, Smith, Nehrbass & North, L.L.C.; Charles C. Garvey, Jr.; Seth M. Nehrbass

(57) ABSTRACT

A reinforcing elastic polymer, such as a urethane/rubber material, is selectively spray-applied over upper, midsole or outsole components of articles of footwear. Such a material sprayed over the toe area of baseball shoes, for example, that is subjected to increased wear during use, serves to improve the durability of that area. A cleated midsole constructed of a lightweight foamed material such as EVA, has an elastic polymer outsole layer selectively spray-applied over the outer surface of the cleated midsole to form a combination midsole/outsole that provides improved durability and traction, as well as superior shock absorption characteristics.

24 Claims, 5 Drawing Sheets

CUSHIONED ATHLETIC CLEAT

CROSS-REFERENCE TO RELATED APPLICATIONS

This is a continuation-in-part of our co-pending U.S. patent application Ser. No. 12/464,682, filed 12 May 2009, which is a continuation-in-part of our co-pending U.S. patent application Ser. No. 12/072,422, filed Feb. 26, 2008, both of which are incorporated herein by reference. Priority of our U.S. Provisional Patent Application Ser. No. 60/904,028, filed 28 Feb. 2007, incorporated herein by reference, is hereby claimed. This is also a continuation-in-part of our co-pending U.S. patent application Ser. No. 12/072,422, filed Feb. 26, 2008.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to footwear (e.g. athletic shoe). More particularly, the present invention relates to an improved footwear article wherein a lighter density cleated midsole (e.g. EVA) has an applied higher density outsole coating of a polyurethane material.

2. General Background of the Invention

This invention relates generally to footwear and, more particularly, to an improved footwear outside and method of selectively strengthening the upper, midsole, insole, and/or outsole components of footwear.

Conventional shoe construction involves a number of molding steps. Those molding steps that involve the midsole and outsole components are typically quite expensive. Some molding can be done economically on the toe, heel, and lace pieces of the upper. Compression and injection molding techniques are most commonly employed in the athletic shoe industry.

Prior art attempts at strengthening the materials used in molding shoes have included additives for reducing slip resistance and increasing the durability of certain wear areas of outsoles. In addition, pieces of plastic or other material are sometimes glued to the midsole to strengthen compression areas and thereby protect against excessive pronation and to provide a foot bridge for the midfoot area.

It would be advantageous to provide an improved method for constructing shoes that minimizes the molding steps required to thereby reduce the cost of production. It would also be advantageous to provide an improved method for constructing shoes that selectively strengthens midsole, upper, and/or outsole components, and that increases the durability or resistance to wear of selected areas of those components.

In accordance with the illustrated preferred embodiments of the present invention, a sprayed material forms the entire outsole or is simply applied over one or more selected areas of a conventional molded outsole to increase the durability of those areas of the outsole. In addition, sprayed material may be selectively applied to midsoles, uppers, and outsoles for purposes of reinforcement.

Cleated footwear used in soccer, football, lacrosse, baseball, and rugby traditionally have outsoles made from heavy, firm, high-density plastic, urethane or nylon materials. The present invention enables manufacturing such cleated footwear using lightweight foamed materials such as ethylene-vinyl acetate (EVA) foam or blown rubber, for example, to produce a midsole having a plurality of cleats formed on the bottom or outer surface thereof.

In accordance with one aspect of the present invention, a coating of an elastic polymer, such as a urethane/rubber or polyurethane-containing material, is applied (e.g. sprayed, rolled, brushed, clad, laminated) at an appropriate consistency and in appropriate thicknesses (e.g. between about 0.1-5.0 millimeters) over the outer surface of the molded cleated foam midsole to form an outsole layer that provides desired durability, torsional stability, flexibility, and cushion characteristics. The outsole layer is thus much harder and tougher than the foam midsole.

If cleated shoe soles were to be constructed of soft foamed materials alone, they would be light weight and would exhibit superior shock absorption and flexibility characteristics, but would be seriously lacking in durability, stability, and traction. With the present invention, the addition of an elastomeric (e.g. polyurethane) outer coating, applied or selectively applied, in accordance with the present invention, would overcome the negatives, while retaining the significant advantages of such construction.

BRIEF SUMMARY OF THE INVENTION

The present invention provides an improved article of footwear that includes an upper component, a midsole component attached to the upper component and the midsole component being of a foam material that includes one or more foam cleated portions. A reinforcing material is selectively applied over the said midsole component to form an outsole layer.

In one embodiment, the reinforcing material includes an elastic polymer such as polyurethane, the polyurethane or elastic polymer being more dense than the foam material of the midsole.

The present invention provides a method of fabricating an article of footwear that includes the providing of an upper component of the article of footwear and a midsole component of the article of footwear attached to the upper component. The midsole component has one or more foam cleats. The method includes selectively applying a reinforcing material onto one or more of the midsole areas including the cleats.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Referring now to FIGS. 1-6, there is shown a cleated (e.g. baseball, soccer, football, lacrosse, rugby) shoe 10 having an upper 11 formed of a suitable material such as nylon, leather, or synthetic leather. In accordance with the present invention, a coating of a material 12 can be applied over the toe region 13 of shoe upper 11. The material 12 can also be applied to the shoe sole or midsole, wherein the shoe sole or midsole is of a soft foam material including the cleats (e.g. ethylene-vinyl acetate or EVA foam). Material 12 may be of the polyurethane-containing type used to line truck beds and may be applied with conventional machines used by companies such as Rhino Linings USA, RAPTOR, and LINE-X. Such material is commercially available from U-POL LIMITED of London, UK (www.u-pol.com), such as specialty coatings RLB/S4, RLB/SV4, RLT/S4 or RLT/SV4 (all sold under the mark "Raptor"). A purchaser of RLB/S4, RLB/SV4, RLT/S4 or RLT/SV4 will receive instructions for application. Such instructions (also available at www.u-pol.com) note that the purchased product is a liquid that is a two part or two component mixture of a 1) base and 2) hardener. The base and hardener are mixed before application. Users can control the pot life and drying times by choosing different speeds of hardeners. A coat can be applied (e.g., sprayed) with a Shutz gun. As an example, the applied coating will be dry to the touch in about 60 minutes at 68 degrees F.

Figure 1:
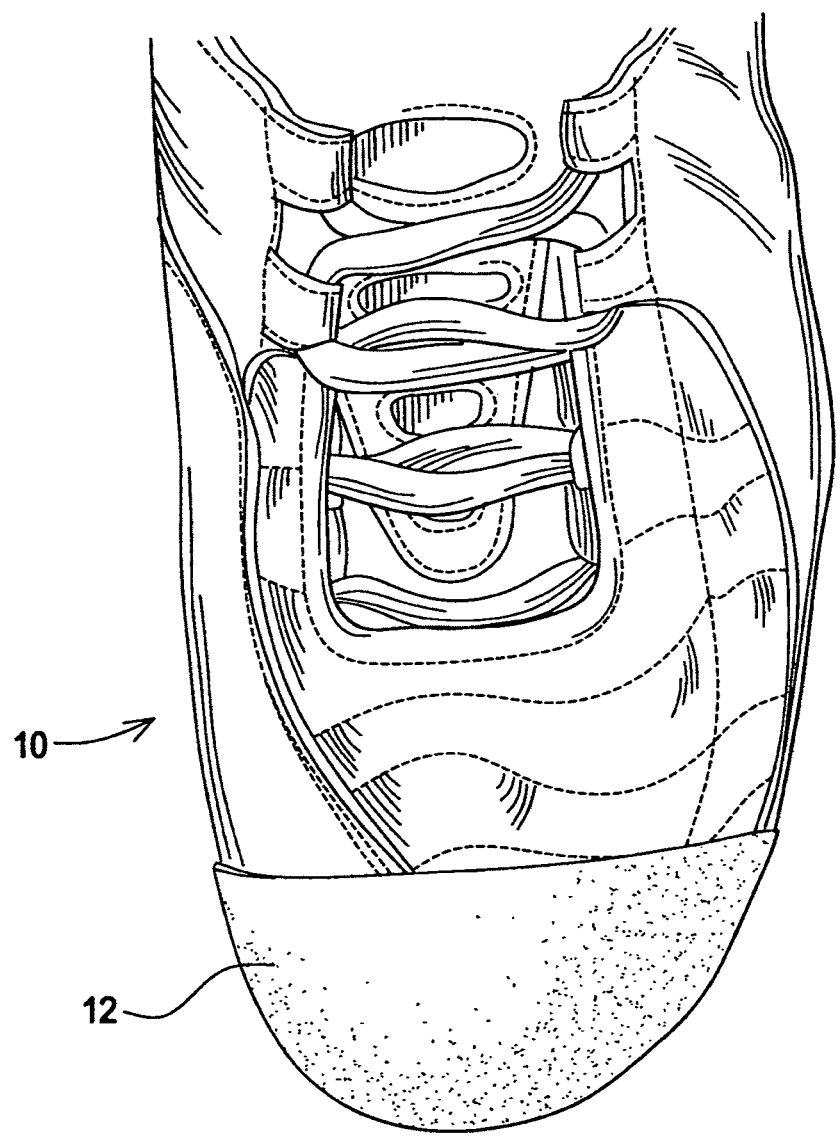
FIG. 1 is a pictorial diagram of a typical baseball shoe illustrating a polyurethane-containing material or similar elastomer spray-applied to the toe area of the shoe upper to provide increased resistance to wear in that area.
Figure 3:
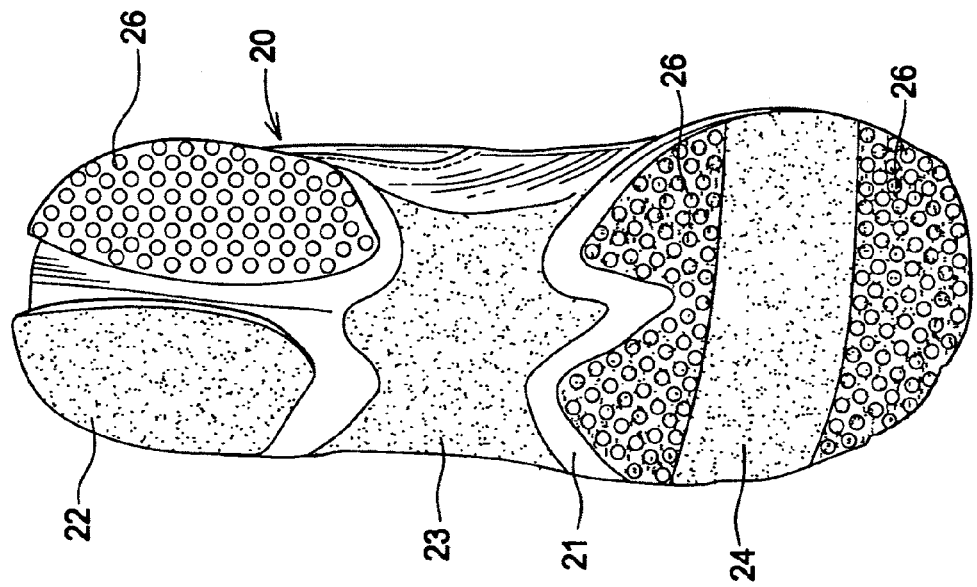
FIG. 3 is a bottom plan view of the molded midsole/outsole of FIG. 2 illustrating a reinforcing material sprayed over the recessed wear areas thereof and over the arch area, for the purpose of bracing and reinforcement of the arch area, in accordance with one aspect of the present invention.
Figure 2:
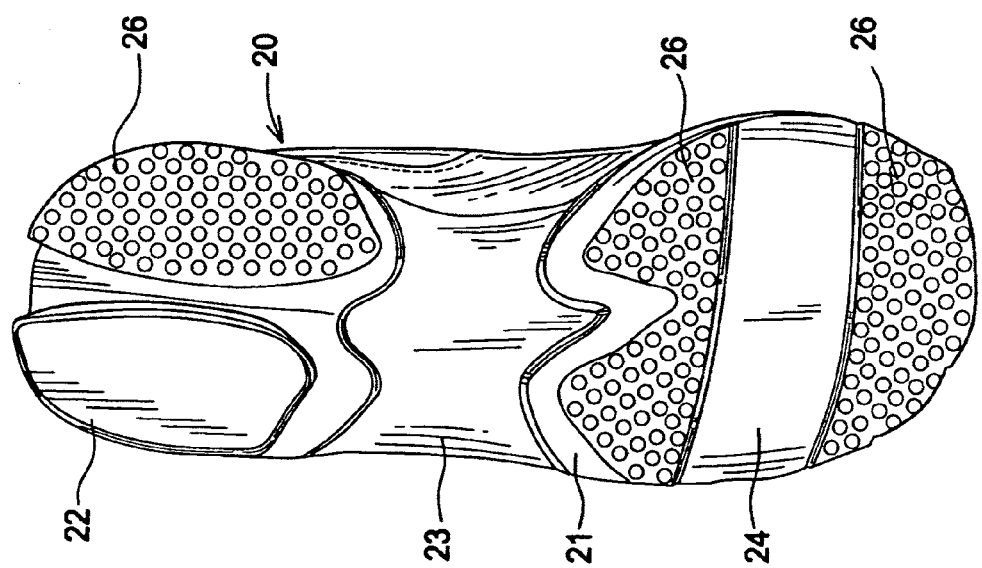
FIG. 2 is a bottom plan view of a molded midsole/outsole of an athletic shoe showing a molded tread pattern in certain areas, the illustrated surface of the molded midsole/outsole being recessed in certain other wear areas.

Referring now to FIG. 2, there is shown a bottom plan view of an athletic shoe 20 having a molded midsole/outsole 21 with a tread pattern molded in wear areas 26 and having other wear areas 22, 24 recessed below the tread surface of areas 26. A strengthening material, such as a polyurethane elastomer, is applied (e.g. sprayed, brushed, clad, laminated glued), in accordance with the present invention, over areas 22, 23, 24 of midsole/outsole 21, as illustrated in FIG. 3. The strengthening material can be applied over arch area 23 of midsole/outsole 21 which forms an arch bridge which provides increased support and torsional stability.

Figure 4:
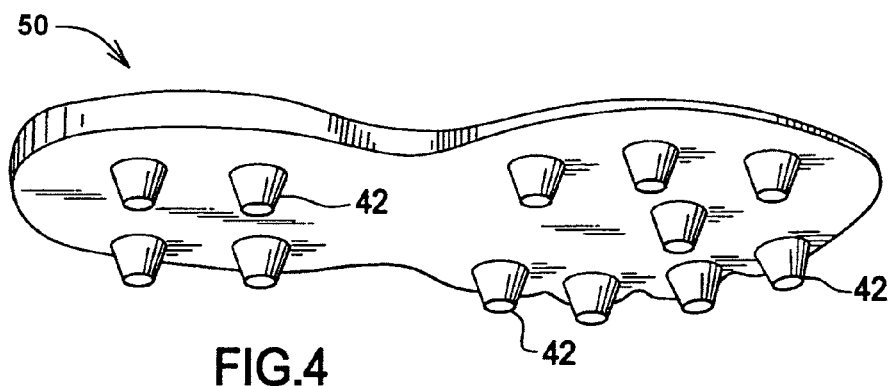
FIG. 4 is a bottom pictorial illustration of a cleated midsole of an athletic shoe, constructed of an EVA or similar foam material, in accordance with the present invention.
Figure 5:
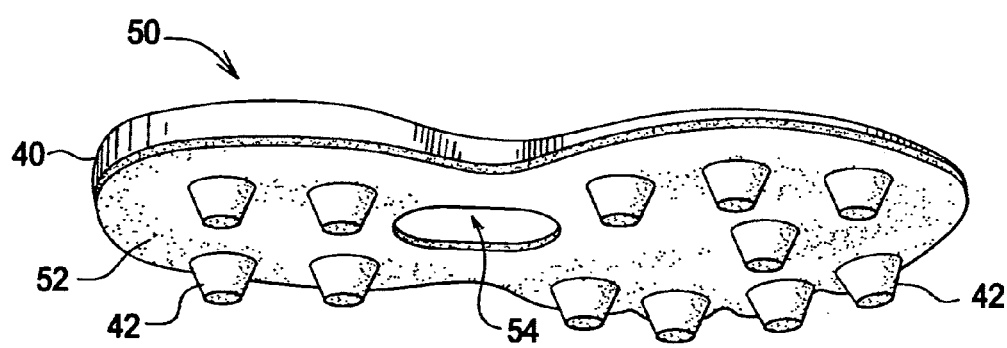
FIG. 5 is a bottom pictorial illustration of the cleated midsole of FIG. 4 having a polyurethane-containing material or similar elastomer sprayed over the cleated bottom surface thereof to form a combination midsole/outsole.
Figure 6:
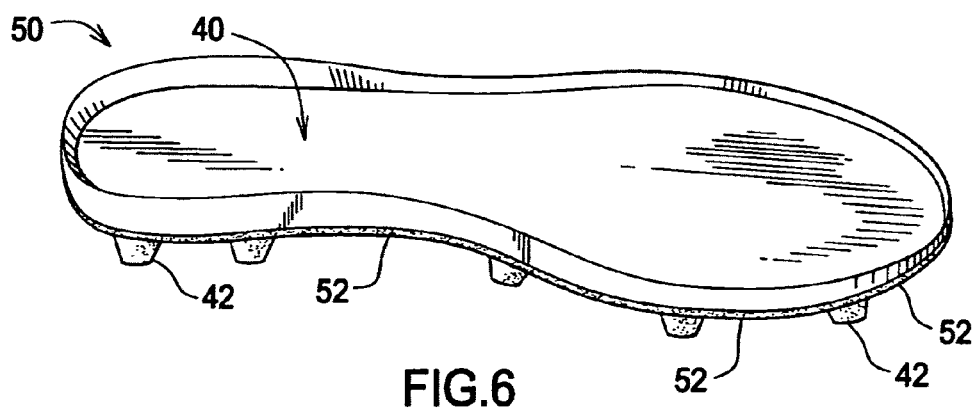
FIG. 6 is a top pictorial illustration of the combination midsole/outsole of FIG. 5.

Referring now to FIG. 4, there is shown a molded midsole 40 that may be employed in a cleated athletic shoe. Midsole 40 may be conventionally molded of an ethylene-vinyl acetate (EVA) or similar foam material to include a plurality of cleats 42 formed on the bottom surface thereof. Thus, the midsole 40 including the cleats 42 can be very light in weight and very shock absorbing. In accordance with the present invention, and as illustrated in FIGS. 5 and 6, a polyurethane-containing material or similar elastomer is applied over the bottom surface of the molded midsole 40 to form a midsole/outsole combination 50 that includes both midsole 40 and an outsole layer 52 of the chosen elastomer. One or more apertures 54 may be formed in outsole layer 52 by masking the aperture area 54 when applying (e.g. spraying) the elastomer.

The one or more aperture areas 54 serve to reduce the overall weight of the shoe and to expose for view a logo or other design molded in the bottom surface of midsole 40.

Figure 7:
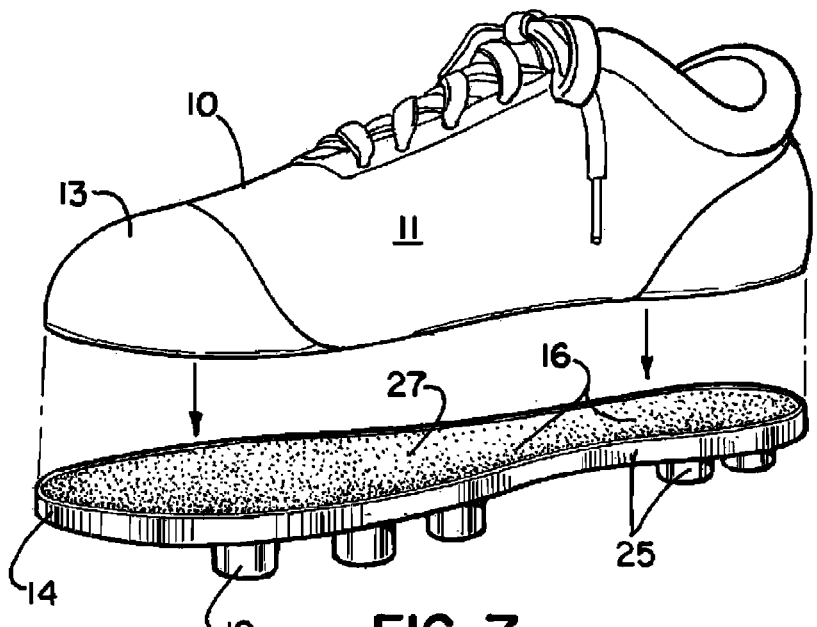
FIG. 7 is an exploded perspective view of the preferred embodiment of the apparatus of the present invention.
Figure 8:
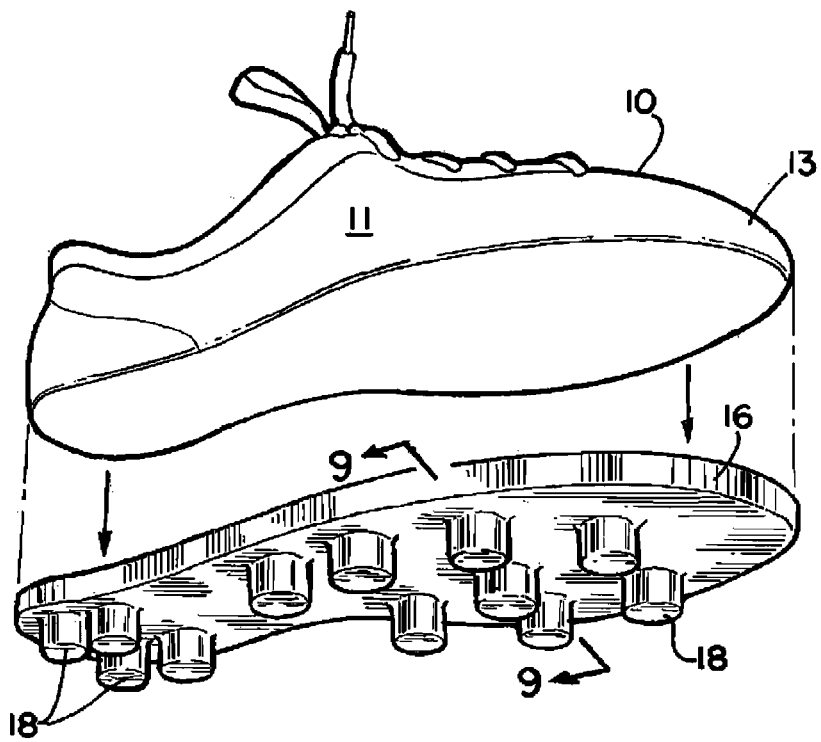
FIG. 8 is another exploded perspective view of the preferred embodiment of the apparatus of the present invention.
Figure 9:
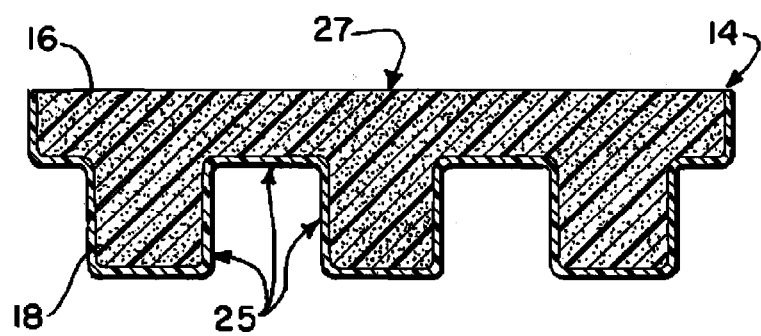
FIG. 9 is a sectional view taken along lines 9-9 of FIG. 8.
Figure 10:
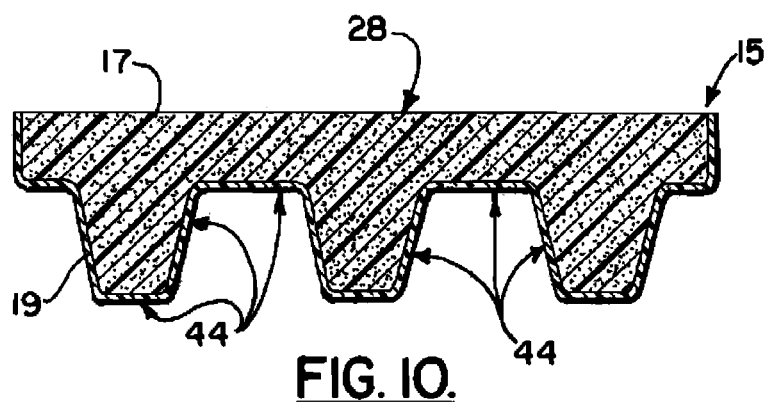
FIG. 10 is a sectional view of the preferred embodiment of the apparatus of the present invention illustrating an alternate cleat shape.

FIGS. 7-10 show additional embodiments of the apparatus of the present invention. In FIG. 7, the shoe 10 provides an upper 11 that can be connected to an outsole 14. The outsole 14 is preferably of a foam material. The foam material of outsole 14 includes foam cleated portions so that a foam cleated sole 16 is provided as part of outsole 14. This foam cleated sole 16 is then coated with a coating 25 of a polyurethane material such as the commercially available specialty coatings RLB/S4, RLB/SV4, RLT/S4, or RLT/SV4, all sold under the trademark "Raptor" by U-POL Limited of London, UK (www.u-pol.com). In FIGS. 7, 8 and 9, the cleats 18 can be generally cylindrically shaped cleats. Such cleats typically have a diameter of about 0.8-1.4 cm and a length of about 0.75-1.75 cm when present on soccer, football, baseball, lacrosse, or rugby athletic cleated shoes. In FIG. 10, the foam cleated sole 17 provides a generally frusto-conically shaped cleat or cleats 19. Such cleats typically have a diameter of about 1.8-2.2 cm (adjacent the bottom of the shoe) to about 0.8-1.2 cm (at the end of the cleat, distal from the bottom of the shoe), and a length of about 0.75-1.75 cm when present on soccer, football, baseball, lacrosse, or rugby athletic cleated shoes. The foam cleated sole 17 can be coated with a coating 44 which can be the same coating as 25 applied in FIG. 9. Each of the foam cleated soles 16, 17 with coatings 25, 44 has a footbed or upper surface that is receptive of a wearer's foot. The outsole 14 provides footbed or upper surface 27. The outsole 15 of FIG. 10 provides a footbed/upper surface 28.

The following is a list of parts and materials suitable for use in the present invention.

| PARTS LIST | |
|---|---|
| Part Number | Description |
| 10 | shoe |
| 11 | upper |
| 12 | coating |
| 13 | toe region |
| 14 | outsole |
| 15 | outsole |
| 16 | foam cleated sole |
| 17 | foam cleated sole |
| 18 | cylindrically shaped cleat |
| 19 | frusto-conically shaped cleat |
| 20 | shoe |
| 21 | midsole/outsole |
| 22 | area |
| 23 | area |
| 24 | area |
| 25 | coating |
| 26 | area |
| 27 | footbed/upper surface |
| 28 | footbed/upper surface |
| 40 | midsole |
| 42 | cleat |
| 44 | coating |
| 50 | midsole/outsole combination |
| 52 | outsole layer |
| 54 | aperture |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A cushioned cleated athletic shoe for use in soccer, football, baseball, lacrosse, or rugby, comprising:
   a) an upper component;
   b) a molded midsole component attached to said upper component, said midsole component being of a soft lightweight foam material and having an outsole configuration that includes a laterally extending outsole surface and multiple generally frusto-conically shaped or generally cylindrically shaped athletic cleats extending downwardly, and an outsole periphery; and
   c) a reinforcing material that is applied over said outsole surface of said midsole component including said athletic cleats and communicating with said periphery of said midsole component, the reinforcing material forming one or more outsole layers that are of a hard material that is harder than said soft lightweight foam material, the soft lightweight foam material of the cleats providing shock absorption and flexibility.

2. A cleated athletic shoe as in claim 1, wherein said reinforcing material is a spray applied material that at least partially covers at least two spaced apart areas of said midsole component including at least heel and toe areas.

3. A cleated athletic shoe as in claim 1, wherein said reinforcing material is a spray applied material that at least partially covers a heel area of said midsole component.

4. A cleated athletic shoe as in claim 1, further comprising one or more apertures formed in said outsole layer.

5. A cleated athletic shoe as in claim 1, wherein said reinforcing material comprises an elastic polymer.

6. A cleated athletic shoe as in claim 5, wherein said elastic polymer comprises a urethane/rubber material.

7. A cushioned cleated athletic shoe for use in soccer, football, baseball, lacrosse, or rugby, comprising:
   a) an upper component;
   b) a midsole component of a first soft lightweight foam material attached to said upper component, said midsole component having a periphery and including multiple generally frusto-conically shaped or generally cylindrically shaped athletic cleats spaced inwardly of said periphery;
   c) an outsole component that is attached to said midsole component including said athletic cleats; and
   d) wherein said outsole component defines a second material that is a reinforcing material attached to one or more selected areas of said outsole component, said areas including at least one area that extends to at least a part of said periphery; and
   e) wherein the second material is harder than said first soft lightweight foam material, the soft lightweight foam material of the cleats providing shock absorption and flexibility.

8. A cleated athletic shoe as in claim 7, wherein said reinforcing material is additionally connected to one or more selected areas of said upper component.

9. A cleated athletic shoe as in claim 7, wherein said reinforcing material comprises an elastic polymer.

10. A cleated athletic shoe as in claim 7, wherein said reinforcing material is a spray applied material that at least partially covers at least two spaced apart areas of said midsole component including at least heel and toe areas.

11. A cleated athletic shoe as in claim 7, wherein said reinforcing material is a spray applied material that at least partially covers a heel area of said midsole component.

12. A cushioned cleated athletic shoe for use in soccer, football, baseball, lacrosse, or rugby comprising:
   a) an upper component;
   b) a midsole component attached to said upper component, said midsole component having a periphery, an outer surface, a plurality of generally frusto-conically shaped or generally cylindrically shaped cleats spaced inwardly of the periphery, and said midsole component being of a first soft lightweight foam material;
   c) an outsole component on the outer surface of the midsole component including said plurality of cleats and extending to said periphery; and
   d) said outsole component defining a reinforcing material that is harder than the first soft lightweight foam material of said midsole component, said outsole component applied to said outer surface of said midsole component including said plurality of cleats, the soft lightweight foam material of the cleats providing shock absorption and flexibility.

13. A cleated athletic shoe as in claim 12, wherein said reinforcing material is a spray applied material that at least partially covers a heel area of said midsole component.

14. A cleated athletic shoe as in claim 12, wherein said reinforcing material is a spray applied material that at least partially covers at least two spaced apart areas of said midsole component including at least heel and toe areas.

15. A cleated athletic shoe as in claim 12, wherein said reinforcing material comprises an elastic polymer.

16. A cleated athletic shoe as in claim 12, wherein said reinforcing material is sprayed over one or more areas of said midsole component.

17. A cleated athletic shoe as in claim 12, wherein said midsole component comprises a molded foam material.

18. A cleated athletic shoe as in claim 17, wherein said molded foam material comprises ethylene-vinyl acetate.

19. A cushioned cleated athletic shoe for use in soccer, football, baseball, lacrosse, or rugby comprising:
   a) an upper component;
   b) a midsole component attached to said upper component, said midsole component having a periphery and being of a soft lightweight foam material and including a plurality of generally frusto-conically shaped or generally cylindrically shaped cleats; and
   c) a reinforcing material selectively applied over all or part of the outer surface of said midsole component to form an outsole layer; and
   d) wherein said reinforcing material extends over multiple of said cleats and to at least a part of said periphery, the reinforcing material being harder than the soft lightweight foam material of the cleats, and the soft lightweight foam material of the cleats providing shock absorption and flexibility.

20. A cleated athletic shoe as in claim 19, wherein said reinforcing material is a spray applied material that at least partially covers at least two spaced apart areas of said midsole component including at least heel and toe areas.

21. A cleated athletic shoe as in claim 19, wherein said reinforcing material is a spray applied material that at least partially covers a heel area of said midsole component.

22. A cleated athletic shoe as in claim 19, wherein said reinforcing material comprises an elastic polymer.

23. A cleated athletic shoe as in claim 19, further comprising a reinforcing material applied over a toe area of said midsole.

24. A cleated athletic shoe as in claim 23, wherein said reinforcing material comprises an elastic polymer.

* * * * *